G. D. ROWELL.
CULTIVATOR-TEETH.
No. 192,390. Patented June 26, 1877.
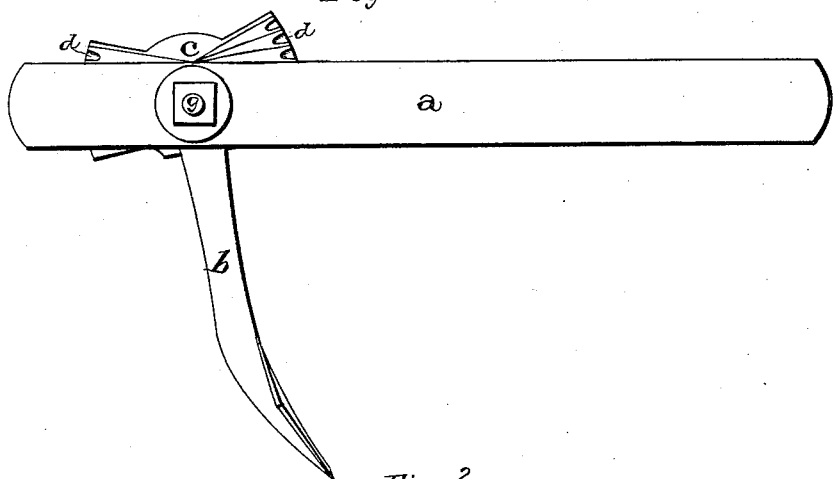
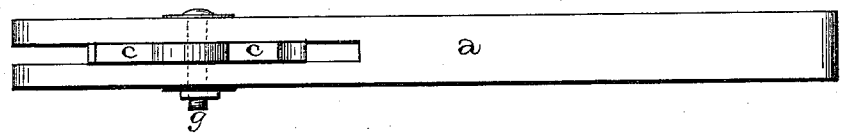
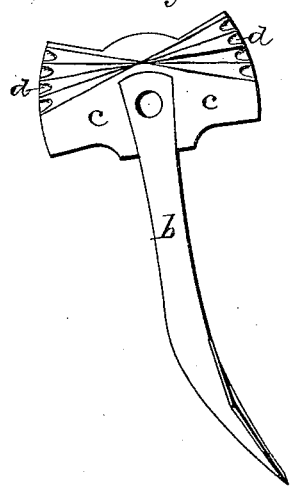

UNITED STATES PATENT OFFICE.

GUILFORD D. ROWELL, OF APPLETON, WISCONSIN, ASSIGNOR TO APPLETON MANUFACTURING COMPANY, OF SAME PLACE.

IMPROVEMENT IN CULTIVATOR-TEETH.

Specification forming part of Letters Patent No. 192,390, dated June 26, 1877; application filed May 21, 1877.

*To all whom it may concern:*

Be it known that I, GUILFORD ROWELL, of the city of Appleton, in the county of Outagamie and State of Wisconsin, have invented certain new and useful Improvements in Cultivator-Teeth; and I do hereby declare the following to be a full, clear, and exact description of the invention, such as will enable others skilled in the art to which it pertains to make and use it, reference being had to the accompanying drawings, which form part of this specification.

My invention relates to an improvement in slip-teeth for seeders and cultivators and it consists in making the tooth separate and detachable from the friction-plate, and clamping the plate and the tooth between the slotted bar, by means of a single bolt, as will be more fully described hereinafter.

The accompanying drawings represent my invention. $a$ represents the usual slotted bar, and $b$ the cultivator-tooth. The upper end of this tooth is held in a suitably-shaped opening made up through the bottom of the friction-plate, $c$. This opening corresponds to the form and shape of the head of the tooth, and as the head of the tooth only rests in this opening, the tooth and the plate can be readily separated whenever desired. This friction-plate $c$ is made of such a length and breadth as to furnish a large amount of frictional surface between the slotted ends of the bar, so as to hold the tooth with any rigidity that may be desired. Upon each side of both ends of this friction-plate are made a number of notches, $d$, and radiating from a central point of the plate toward each end are a number of lines drawn. These lines being an equal distance apart, enable each tooth to be set at exactly the same angle. Passing through the sides of the bar and through the head of the tooth is the clamping-bolt $g$, by means of which the tooth can be clamped in position, either so as to give at any desired pressure or to be perfectly rigid and immovable.

By having the friction-plate made separate from the tooth the plate can be made of cast-iron, which not only makes it cheaper but makes the tooth heavier and better adapted for hard ground, and by means of the lines, figures, or notches on the side of the plate every tooth can be quickly and accurately adjusted to exactly the same pitch.

Having thus described my invention, I claim—

The friction-plate $c$ having a socket in its lower edge through the entire thickness of the plate, which socket is largest at its upper end, to receive the enlarged head of the tooth $b$, whereby the tooth and plate can only be separated by a sidewise movement, substantially as shown.

In testimony that I claim the foregoing I have hereunto set my hand this 14th day of May, 1877.

G. D. ROWELL.

Witnesses:
G. P. MOESKES,
F. J. THOMPSON.